(12) United States Patent
Wang

(10) Patent No.: US 11,353,052 B2
(45) Date of Patent: Jun. 7, 2022

(54) FASTENER AND METHOD OF MOUNTING THE SAME IN PLACE

(71) Applicant: DTECH PRECISION INDUSTRIES CO., LTD., New Taipei (TW)

(72) Inventor: Ting-Jui Wang, New Taipei (TW)

(73) Assignee: DTECH PRECISION INDUSTRIES CO., LTD., New Taipei (TW)

( * ) Notice: Subject to any disclaimer, the term of this patent is extended or adjusted under 35 U.S.C. 154(b) by 107 days.

(21) Appl. No.: 16/928,006

(22) Filed: Jul. 14, 2020

(65) Prior Publication Data

US 2021/0018029 A1 Jan. 21, 2021

(30) Foreign Application Priority Data

Jul. 19, 2019 (TW) ................................. 108125752

(51) Int. Cl.
*F16B 21/09* (2006.01)
*F16B 4/00* (2006.01)

(52) U.S. Cl.
CPC .............. *F16B 21/09* (2013.01); *F16B 4/004* (2013.01)

(58) Field of Classification Search
CPC .......... F16B 21/09; F16B 4/004; F16B 17/00; F16B 5/0036; B21D 39/00; A47B 57/50; A47G 1/205
See application file for complete search history.

(56) References Cited

U.S. PATENT DOCUMENTS

| | | | |
|---|---|---|---|
| 6,312,186 B1 * | 11/2001 | Rock ....................... | F16B 12/34 403/353 |
| 8,511,954 B2 * | 8/2013 | Fink ....................... | F16B 5/0036 411/104 |
| 2019/0299396 A1 * | 10/2019 | Weitsman .............. | A47G 1/205 |

FOREIGN PATENT DOCUMENTS

| CN | 202914461 U | 5/2013 |
|---|---|---|
| TW | M579220 U | 6/2019 |

* cited by examiner

*Primary Examiner* — Lee A Holly

(57) ABSTRACT

A fastener and a method of mounting the same in place includes a fitting portion, an engaging portion and a filler portion. The fastener passes through a sliding hole of an object, and then the fitting portion presses against the object, allowing a material of the object to enter or flow into the filler portion, so as to fit the fastener and the object firmly together. The engaging portion is engaged with or removed from another object. Therefore, the fastener and the method can couple together and separate at least two objects repeatedly and rapidly.

26 Claims, 17 Drawing Sheets

12

(a)  (b)  (c)  (d)  (e)  (f)  (g)

FASTENER AND METHOD OF MOUNTING THE SAME IN PLACE

CROSS-REFERENCE TO RELATED APPLICATION

This non-provisional application claims priority under 35 U.S.C. § 119(a) on Patent Application No(s). 108125752 filed in Taiwan, R.O.C. on Jul. 19, 2019, the entire contents of which are hereby incorporated by reference.

BACKGROUND OF THE INVENTION

1. Field of the Invention

The present disclosure relates to a fastener and a method of mounting the same in place, and in particular to a fastener and a method of mounting the same in place to not only fit the fastener firmly to an object but also allow the fastener to be engaged with or removed from another object, so as to couple together and separate at least two objects repeatedly and rapidly.

2. Description of the Related Art

Conventionally, coupling together at least two objects (or three objects) requires fastening them together with screws.

Although the aforesaid prior art is effective in coupling together at least two objects to render them inseparable, the aforesaid prior art not only fails to render the coupling process easy but its use of screws also renders at least one object difficult to demount.

Therefore, it is important to provide a fastener and a method of mounting the same in place to fit the fastener firmly to an object and allow the fastener to be engaged with or removed from another object, so as to couple together and separate at least two objects repeatedly and rapidly.

BRIEF SUMMARY OF THE INVENTION

An objective of the present disclosure is to provide a fastener and a method of mounting the same in place to fit the fastener firmly to an object and allow the fastener to be engaged with or removed from another object, so as to couple together and separate at least two objects repeatedly and rapidly.

To achieve at least the above objective, the present disclosure provides a fastener and a method of mounting the same in place. The fastener comprises a fitting portion, an engaging portion and a filler portion. The fastener passes through a sliding hole of an object, and then the fitting portion presses against the object, allowing a material of the object to enter or flow into the filler portion, so as to fit the fastener to the object.

Regarding the fastener, the engaging portion has a head portion and a body portion. The head portion and the body portion are movably fitted together. The fitting portion and the filler portion are disposed at the body portion or the head portion.

Regarding the fastener, the sliding hole is in communication with a spreading hole portion. The spreading hole portion is larger than the sliding hole. The fitting portion or the engaging portion passes through the spreading hole portion and then moves to the sliding hole. The fitting portion presses against the object. Therefore, the material of the object can enter or flow into the filler portion, so as to fit the fastener and the object together.

Regarding the fastener, the engaging portion is an inner thread, outer thread, cylindrical member, external fastener, internal fastener, dented member, hole member, raised member, stepped member, oblique surface member, arcuate surface member or curved surface member.

Regarding the fastener, a die presses against the fitting portion or presses against the object, so as to fit the fitting portion and the object together.

Regarding the fastener, a die presses against the material dedicated to the object and positioned proximate to the sliding hole to allow a material of the object to deform at the sliding hole, such that the deformed material blocks the sliding hole to stop the fitting portion, or allow a material of the object to enter or flow into the filler portion.

Regarding the fastener, when the material of the object enters or flows into the filler portion, volume of the material of the object is equal to, less than or slightly greater than volume of the filler portion.

Regarding the fastener, the sliding hole 101 is slender, hourglass, substantially semicircular, semicircular, hole-broken shaped, groove-broken shaped, oblong, elliptical, or of any shape with aspect ratio other than 1:1.

Regarding the fastener, the fitting portion fits to the sliding hole, and the width of the sliding hole is less than the width of the fitting portion.

Regarding the fastener, a die presses against the fitting portion or the object, so as to fit the fitting portion and the object together. The die has at least one shaping portion. The shaping portion presses against the material dedicated to the object and positioned proximate to the sliding hole. Thus, the material of the object is deformed within the sliding hole. The deformed material blocks the sliding hole to stop the fitting portion. Alternatively, the material of the object can enter or flow into the filler portion.

Regarding the fastener, the shaping portion is a raised portion, dented portion, hole portion, groove portion, stepped portion, arcuate portion, curved surface portion, oblique surface portion or plane portion.

Regarding the fastener, displacement of the fitting portion or the filler portion within the sliding hole ranges from 0.001 mm to 1000 mm.

Regarding the fastener, the fitting portion or the filler portion moves laterally, vertically or rotatably within the sliding hole.

Regarding the fastener, the width of the fitting portion is greater than the width of the filler portion, or the width of the fitting portion is greater than, less than or equal to the width of the engaging portion.

Regarding the fastener, the width of the engaging portion is greater than the width of the filler portion, or the width of the engaging portion is greater than, less than or equal to the width of the fitting portion.

Regarding the fastener, the filler portion has a blocking portion surrounding the filler portion.

Regarding the fastener, the engaging portion is a handle portion.

Regarding the fastener, the handle portion has at least one seat portion.

Regarding the fastener, the seat portion has at least one fitting portion or at least one filler portion.

Regarding the fastener, when the engaging portion, the head portion or the body portion is larger than the fitting portion, the engaging portion, the head portion or the body portion larger than the fitting portion passes through the sliding hole of the object, such that the fitting portion presses against the object to enable the material of the object to enter or flow into the filler portion, so as to fit the fastener and the object together.

Regarding the fastener, the sliding hole is in communication with a spreading hole portion, and the spreading hole portion is larger than the sliding hole. When the engaging portion, the head portion or the body portion is larger than the fitting portion, the engaging portion, the head portion or the body portion larger than the fitting portion passes through the spreading hole portion of the object, and the fitting portion moves to the sliding hole. Thus, the fitting portion presses against the object. Therefore, the material of the object can enter or flow into the filler portion, so as to fit the fastener and the object together.

Regarding the fastener, another die carries the object and the fastener, whereas the other die has an obstructing portion for confining the fastener to a fitting position conducive to the fastener's pressing against and fitting to the object.

Regarding the fastener, the fitting position is one that brings the maximum fitting strength, one of a predetermined fitting target, one that enables the fitting portion to press against the object with the largest area of, or one that allows the engaging portion, the body portion or the head portion to rest on the rim of the sliding hole.

Regarding the fastener, the obstructing portion has a resilient structure whereby the obstructing portion undergoes motion in accordance with a press journey when the die presses against the fitting portion or the object.

Regarding the fastener, the hardness of the fastener is greater than the hardness of the object.

Regarding the fastener, the fastener has an anti-rotation portion, and the object has a corresponding anti-rotation portion, such that the anti-rotation portion and the corresponding anti-rotation portion correspond in position to each other and prevent rotation.

The present disclosure further provides a method of mounting a fastener in place, comprising the step of passing the fastener through a sliding hole of an object to enable the fitting portion to press against the object and thus enable a material of the object to enter or flow into the filler portion, so as to fit the fastener and the object together.

The method entails using a die or apparatus to press against or stamp the fitting portion or the object to enable the fitting portion to press against the object and thereby enable the material of the object to enter or flow into the filler portion.

Regarding the method, the sliding hole is in communication with a spreading hole portion larger than the sliding hole, and the fitting portion or engaging portion passes through the spreading hole portion before engaging with the sliding hole and allowing the fitting portion to press against the object, such that the material of the object can enter or flow into the filler portion, so as to fit the fastener and the object together.

Regarding the method, the sliding hole is in communication with a spreading hole portion larger than the sliding hole, wherein, when the engaging portion, the head portion or the body portion is larger than the fitting portion, the engaging portion, the head portion or the body portion larger than the fitting portion passes through the spreading hole portion of the object, and the fitting portion moves to engage with the sliding hole, with the fitting portion pressing against the object, such that the material of the object can enter or flow into the filler portion, so as to fit the fastener and the object together.

Regarding the method, the sliding hole is in communication with a spreading hole portion larger than the sliding hole.

Therefore, the present disclosure provides the fastener and the method of mounting the same in place to not only fit the fastener firmly to an object but also allow the engaging portion of the fastener to be engaged with or removed from another object, so as to couple together and separate at least two objects repeatedly and rapidly.

DETAILED DESCRIPTION OF THE INVENTION

Figure 1:
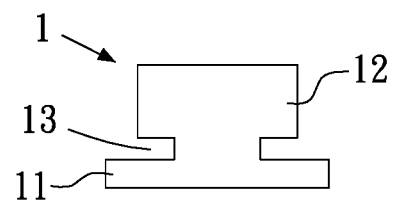
FIG. 1 is a cross-sectional view of a fastener according to the first embodiment of the present disclosure.
Figure 2:
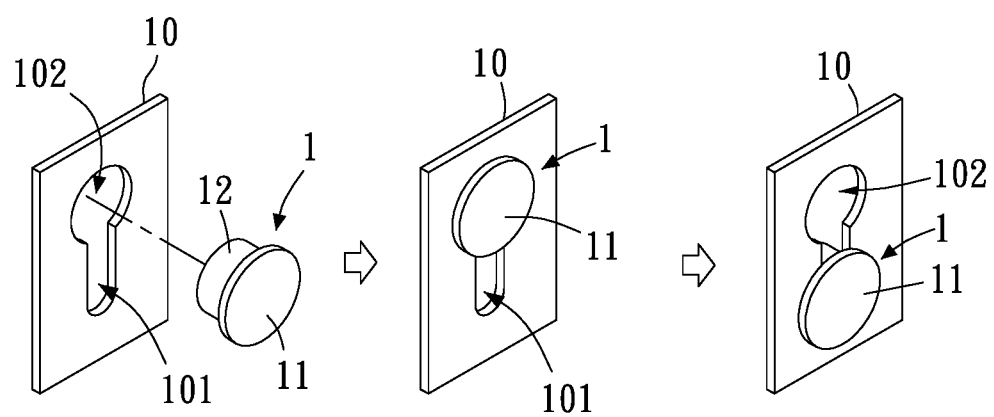
FIG. 2 is a schematic view 1 of how to mount the fastener in place according to the first embodiment of the present disclosure.
Figure 3:
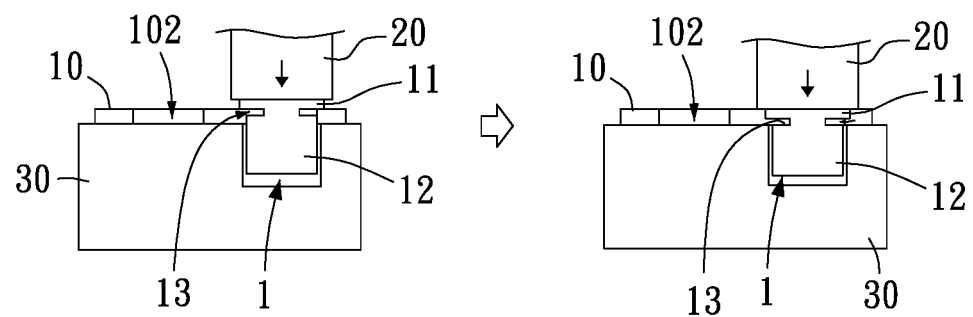
FIG. 3 is a schematic view 2 of how to mount the fastener in place according to the first embodiment of the present disclosure.
Figure 4:
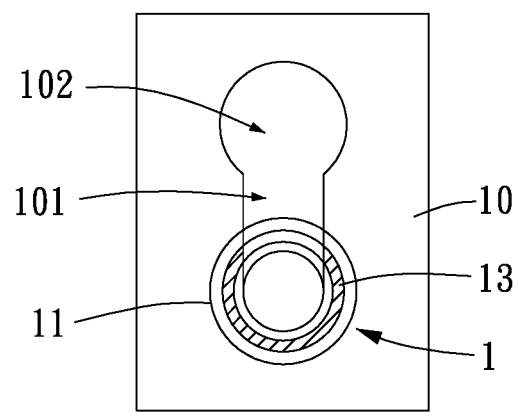
FIG. 4 is a schematic view of the fastener mounted in place according to the first embodiment of the present disclosure.

To facilitate understanding of the object, characteristics and effects of this present disclosure, embodiments together with the attached drawings for the detailed description of the present disclosure are provided.

Referring to FIG. 1 through FIG. 4, the present disclosure provides a fastener and a method of mounting the same in place. The fastener 1 comprises a fitting portion 11, an engaging portion 12 and a filler portion 13. The engaging portion 12 of the fastener 1 passes through a sliding hole 101 of an object 10, and then the fitting portion 11 presses against the object 10, allowing a material of the object 10 to enter or flow into the filler portion 13, so as to fit the fastener 1 to the object 10.

Mounting the fastener 1 in place entails performing the steps of: passing the engaging portion 12 through the sliding hole 10 of the object 10; and pressing the fitting portion 11, such that the fitting portion 11 presses against the object 10, thereby allowing a material of the object 10 to enter or flow into the filler portion 13, so as to fit the fastener 1 and the object 10 together firmly. After the fastener 1 and the object 10 have been fitted together, the engaging portion 12 is engaged with or is removed from another object (not shown). Therefore, the fastener 1 is effective in coupling together and separating at least two objects repeatedly and rapidly.

In a preferred embodiment of the present disclosure, the sliding hole 101 is in communication with a spreading hole portion 102. The spreading hole portion 102 is larger than the sliding hole 101. After passing through the spreading hole portion 102, the fitting portion 11 (the engaging portion 12) moves to the sliding hole 101, and the fitting portion 11 presses against the object 10, thereby allowing the material of the object 10 to enter or flow into the filler portion 13, so as to fit the fastener 1 to the object 10 firmly.

In a preferred embodiment of the present disclosure, a die 20 (or apparatus) presses against the fitting portion 11 (or presses against the object 10), such that the fitting portion 11 presses against the object 10, allowing the material of the object 10 to enter or flow into the filler portion 13, so as to fit the fastener 1 to the object 10. In practice, after the fitting portion 11 has moved to the sliding hole 101, another die 30 carries the object 10, and then the die 20 presses against the fitting portion 11; thus, the fitting portion 11 presses against the object 10. As a result, the material of the object 10 can enter or flow into the filler portion 13, but the material located at part of the sliding hole 101 and positioned proximate to the spreading hole portion 102 does not enter or flow into the filler portion 13, allowing the fastener 1 to fit to the object 10 firmly.

In a preferred embodiment of the present disclosure, when the material of the object 10 enters or flows into the filler portion 13, the volume of the material of the object 10 is equal to, less than or slightly greater than the volume of the filler portion 13. Therefore, the present disclosure meets practical needs.

In a preferred embodiment of the present disclosure, the sliding hole 101 is hourglass, elliptical, substantially semicircular, semicircular, hole-broken shaped, groove-broken shaped, oblong, slender or of any shape with aspect ratio other than 1:1. Therefore, the present disclosure meets practical needs.

In a preferred embodiment of the present disclosure, displacement of the fitting portion 11 or the filler portion 13 within the sliding hole 101 ranges from 0.001 mm to 1000 mm. Therefore, the present disclosure meets practical needs.

In a preferred embodiment of the present disclosure, the fitting portion 11 or the filler portion 13 moves laterally, vertically or rotatably within the sliding hole 101. Therefore, the present disclosure meets practical needs.

In a preferred embodiment of the present disclosure, the width of the fitting portion 11 is greater than the width of the filler portion 13. In a variant embodiment of the present disclosure, the width of the fitting portion 11 is greater than, less than or equal to the width of the engaging portion 12. Therefore, the present disclosure meets practical needs.

In a preferred embodiment of the present disclosure, the width of the engaging portion 12 is greater than the width of the filler portion 13. In a variant embodiment of the present disclosure, the width of the engaging portion 12 is greater than, less than or equal to the width of the fitting portion 11. Therefore, the present disclosure meets practical needs.

In a preferred embodiment of the present disclosure, the hardness of the fastener 1 is greater than the hardness of the object 10. Therefore, the fitting portion 11 presses against the object 10, such that the material of the object 10 can enter or flow into the filler portion 13, so as to fit the fastener 1 and the object 10 together.

Figure 5:
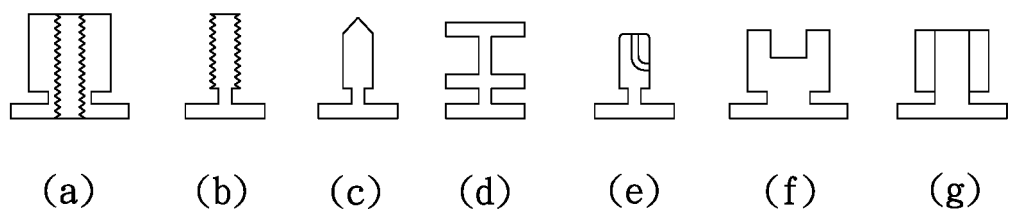
FIG. 5 is a schematic view of different structural forms of an engaging portion of the fastener of the present disclosure.

Referring to FIG. 5, in a preferred embodiment of the present disclosure, the engaging portion 12 is an inner thread (part a shown in FIG. 5), outer thread (part b shown in FIG. 5), cylindrical member (part c shown in FIG. 5), external fastener (part d shown in FIG. 5), internal fastener (part e shown in FIG. 5), dented member (part f shown in FIG. 5), hole member (part g shown in FIG. 5), raised member, stepped member, oblique surface member, arcuate surface member or curved surface member. Therefore, the present disclosure meets practical needs.

Figure 6:
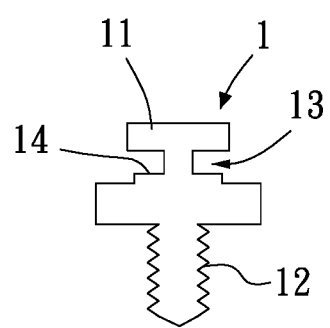
FIG. 6 is a cross-sectional view of the fastener according to the second embodiment of the present disclosure.

Referring to FIG. 6, in a preferred embodiment of the present disclosure, the filler portion 13 has a blocking portion 14 surrounding the filler portion 13, and the blocking portion 14 blocks and stops the material of the object (not shown) when the fitting portion 11 presses against the object, so as to fit the fastener 1 and the object together.

Figure 7:
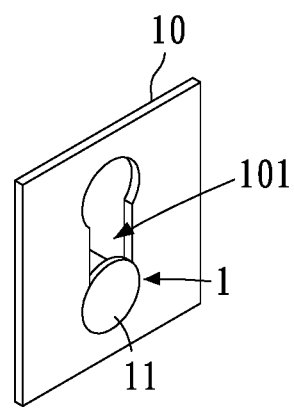
FIG. 7 is a schematic view of the fastener mounted in place according to the third embodiment of the present disclosure.

Referring to FIG. 7, in a preferred embodiment of the present disclosure, the fitting portion 11 is fitted to the sliding hole 101, and the width of the sliding hole 101 is less than the width of the fitting portion 11, so as to fit the fastener 1 and the object 10 firmly together.

Figure 8:
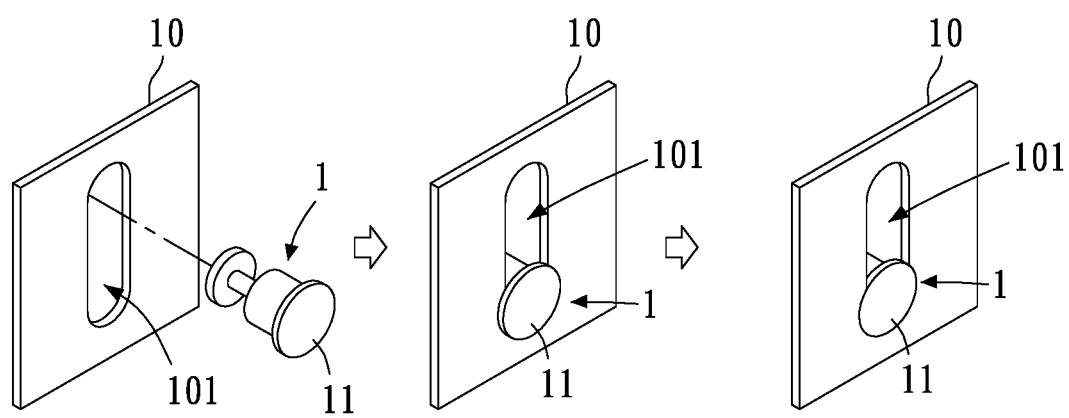
FIG. 8 is a schematic view of the fastener mounted in place according to the fourth embodiment of the present disclosure.
Figure 9:
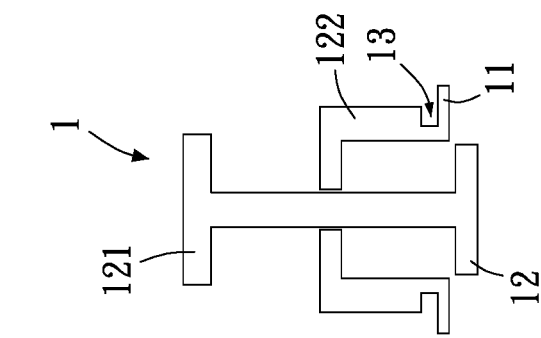
FIG. 9 is a cross-sectional view of the fastener mounted in place according to the fifth embodiment of the present disclosure.
Figure 10:
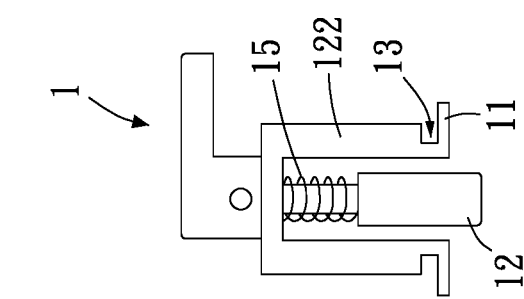
FIG. 10 is a cross-sectional view of the fastener mounted in place according to the sixth embodiment of the present disclosure.
Figure 11:
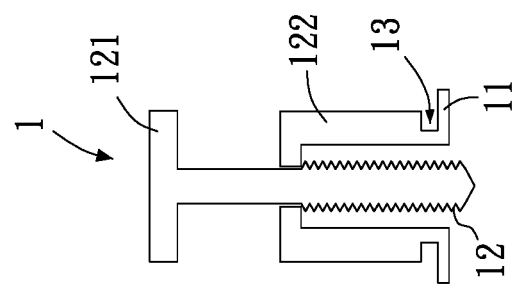
FIG. 11 is a cross-sectional view of the fastener mounted in place according to the seventh embodiment of the present disclosure.
Figure 12:
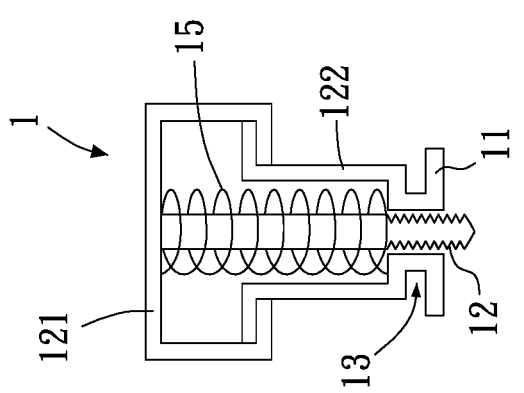
FIG. 12 is a cross-sectional view of the fastener mounted in place according to the eighth embodiment of the present disclosure.
Figure 13:
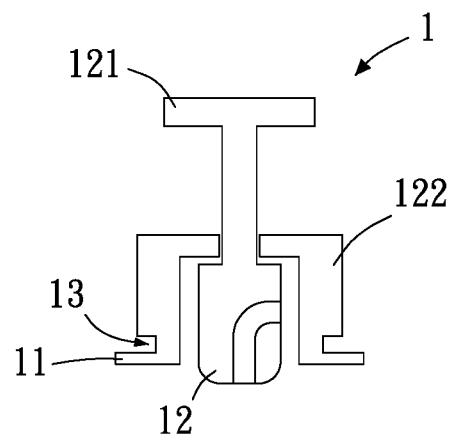
FIG. 13 is a cross-sectional view of the fastener mounted in place according to the ninth embodiment of the present disclosure.

Referring to FIG. 8, in a preferred embodiment of the present disclosure, the sliding hole 101 is slender and can stamp the fitting portion 11, such that the fitting portion 11 is upset and inserted into the object 10, so as to fit the fastener 1 and the object 10 firmly together.

Referring to FIG. 9 through FIG. 13, in a preferred embodiment of the present disclosure, the engaging portion 12 has a head portion 121 and a body portion 122. The head portion 121 and the body portion 122 are movably fitted together. The fitting portion 11 and the filler portion 13 are disposed at the body portion 122 (or the head portion 121). The engaging portion 12 is an outer thread (shown in FIG. 9 and FIG. 10), cylindrical member (shown in FIG. 11), external fastener (shown in FIG. 12), or internal fastener (shown in FIG. 13). The fastener 1 further comprises a resilient component 15. The resilient component 15 has one end abutting against the head portion 121 and another end abutting against the body portion 122 (shown in FIG. 9). Alternatively, the resilient component 15 has one end abutting against the engaging portion 12 and another end abutting against the body portion 122 (shown in FIG. 11). Therefore, the resilient component 15 abuts against the engaging portion 12 engaging with another object or effects automatic resilient restoration of the engaging portion 12 removed from another object, Therefore, the present disclosure meets practical needs.

Figure 14:
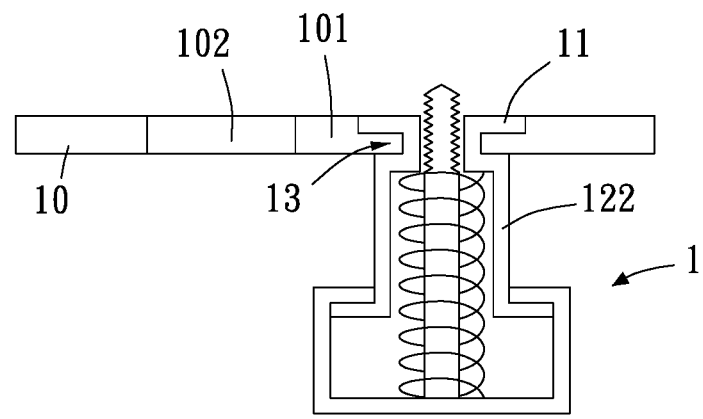
FIG. 14 is a schematic view of the fastener mounted in place according to the tenth embodiment of the present disclosure.

Referring to FIG. 14, in a preferred embodiment of the present disclosure, the fitting portion 11 passes through the spreading hole portion 102 and then moves to the sliding hole 101, and the fitting portion 11 presses against the object 10. Therefore, the material of the object 10 can enter or flow into the filler portion 13, so as to fit the body portion 122 of the fastener 1 and the object 10 together.

Figure 15:
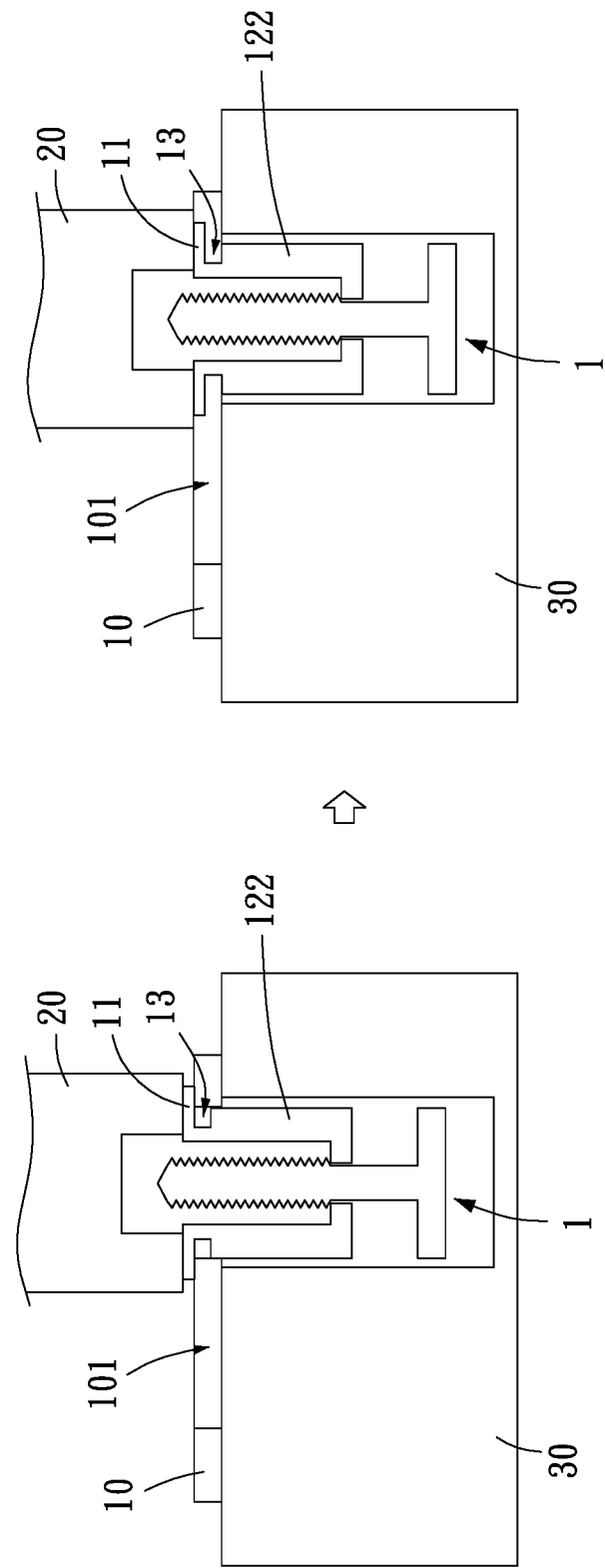
FIG. 15 is a schematic view of the fastener mounted in place according to the eleventh embodiment of the present disclosure.

Referring to FIG. 15, in a preferred embodiment of the present disclosure, after the fitting portion 11 has moved to the sliding hole 101, another die 30 carries the object 10. Then, the die 20 presses against the fitting portion 11, such that the fitting portion 11 presses against the object 10. Thus, the material of the object 10 can enter or flow into the filler portion 13, so as to fit the body portion 122 of the fastener 1 and the object 10 together.

Figure 16:
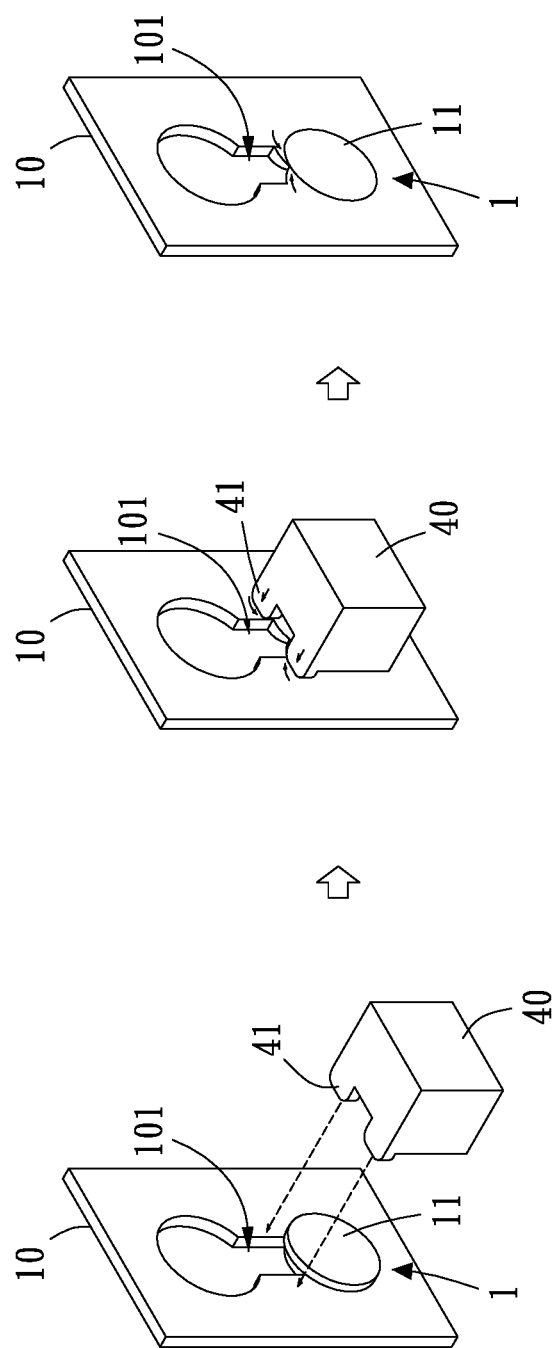
FIG. 16 is a schematic view of the fastener mounted in place according to the twelfth embodiment of the present disclosure.

Referring to FIG. 16, in a preferred embodiment of the present disclosure, a die 40 presses against the material dedicated to the object 10 and positioned proximate to the sliding hole 101, such that the material of the object 10 is deformed within the sliding hole 101. The deformed material blocks the sliding hole 101 to stop the fitting portion 11. Therefore, the material of the object 10 can enter or flow into the filler portion 13, so as to fit the fastener 1 and the object 10 firmly together.

In a preferred embodiment of the present disclosure, the die 40 presses against the fitting portion 11, so as to fit the fitting portion 11 and the object 10 together. The die 40 has at least one shaping portion 41. The shaping portion 41 presses against the material dedicated to the object 10 and positioned proximate to the sliding hole 101. Thus, the material of the object 10 is deformed within the sliding hole 101. The deformed material blocks the sliding hole 101 to stop the fitting portion 11. Therefore, the material of the object 10 can enter or flow into the filler portion 13, so as to fit the fastener 1 and the object 10 firmly together.

In a preferred embodiment of the present disclosure, the shaping portion 41 is a raised portion, dented portion, hole portion, groove portion, stepped portion, arcuate portion, curved surface portion, oblique surface portion or plane portion. Therefore, the present disclosure meets practical needs.

Figure 17:
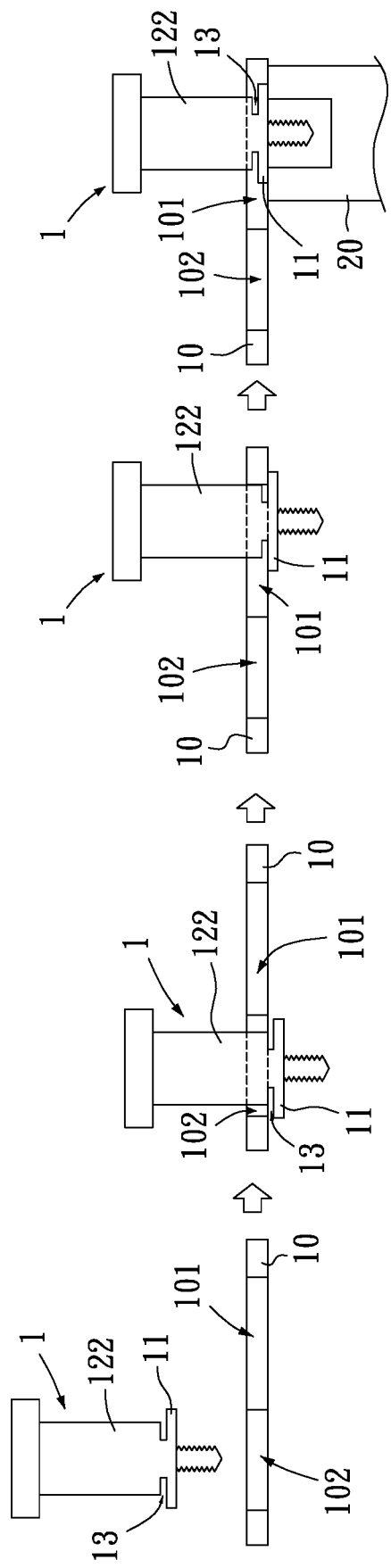
FIG. 17 is a schematic view of the fastener mounted in place according to the thirteen embodiment of the present disclosure.

Referring to FIG. 17, in a preferred embodiment of the present disclosure, after passing through the spreading hole portion 102, the fitting portion 11 moves to the sliding hole 101, and then the die 20 presses against the fitting portion 11, such that the fitting portion 11 presses against the object 10. Thus, the material of the object 10 can enter or flow into the filler portion 13, so as to fit the body portion 122 of the fastener 1 and the object 10 together.

Figure 18:
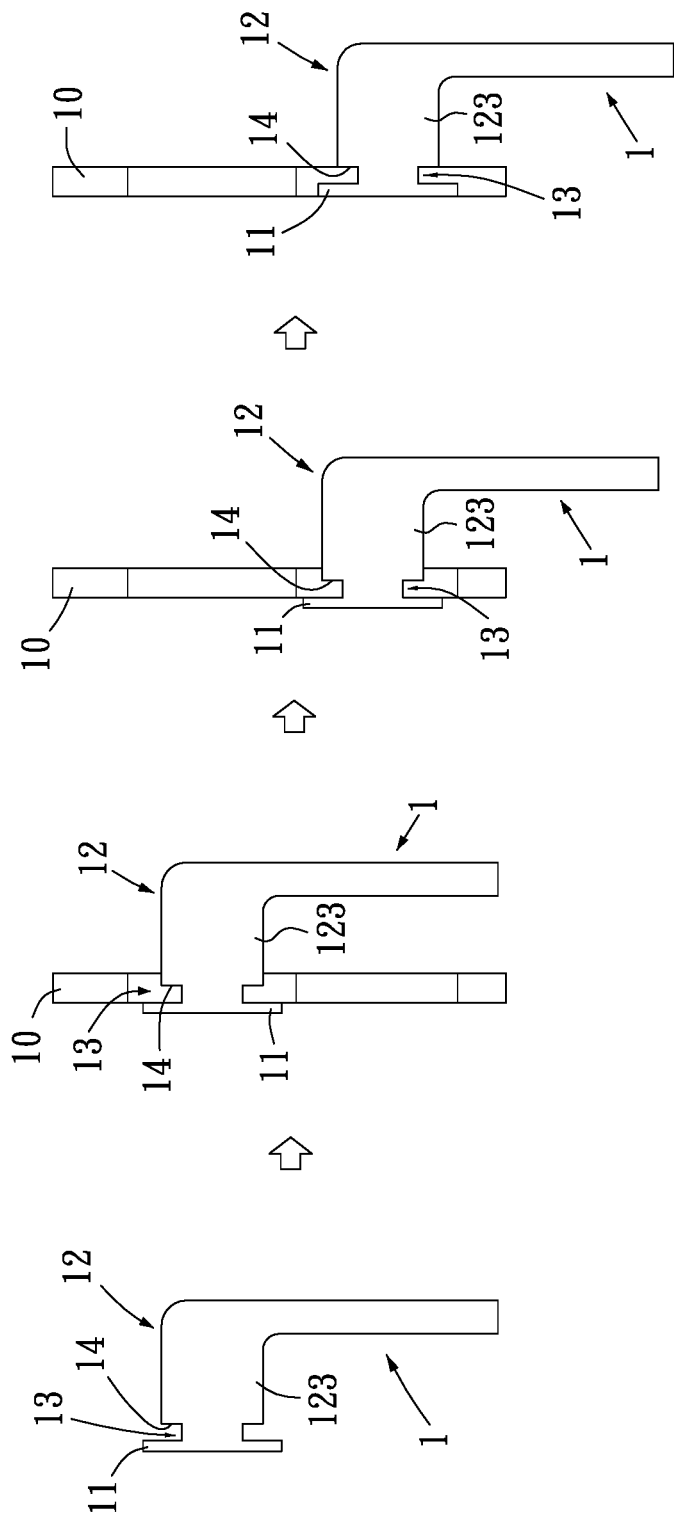
FIG. 18 is a schematic view of the fastener mounted in place according to the fourteenth embodiment of the present disclosure.

Referring to FIG. 18, in a preferred embodiment of the present disclosure, the engaging portion 12 is a handle portion. The handle portion has a seat portion 123. The seat portion 123 has a fitting portion 11 and a filler portion 13. The filler portion 13 has a blocking portion 14 surrounding the filler portion 13. When the fitting portion 11 presses against the object 10 to allow the material of the object 10 to enter or flow into the filler portion 13, the blocking portion 14 blocks and stops the material of the object 10, so as to fit the fastener 1 and the object 10 firmly together.

Figure 19:
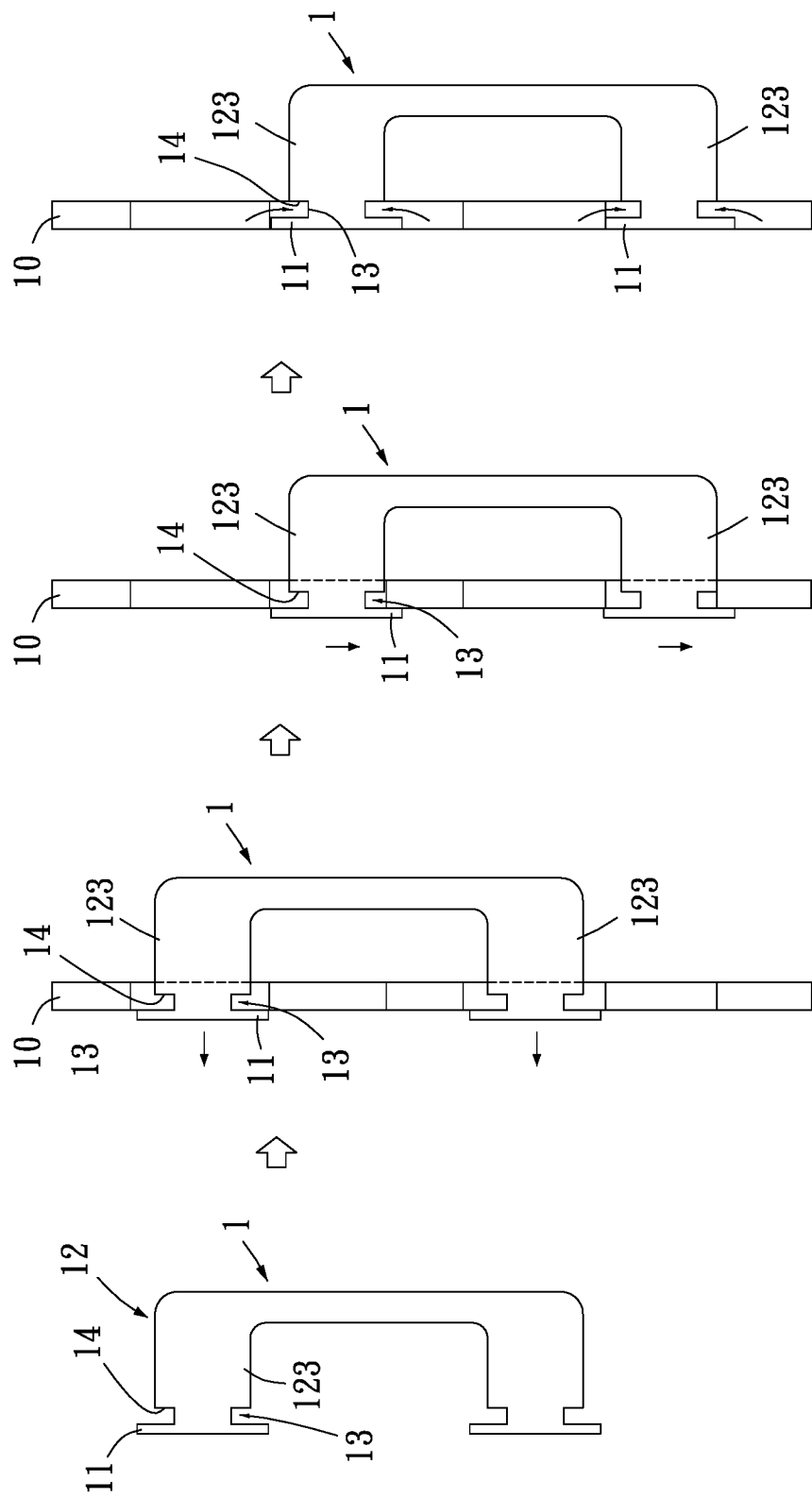
FIG. 19 is a schematic view of the fastener mounted in place according to the fifteenth embodiment of the present disclosure.

Referring to FIG. 19, in a preferred embodiment of the present disclosure, the engaging portion 12 is a handle portion. The handle portion has two seat portions 123. The seat portions 123 each have a fitting portion 11 and a filler portion 13. Each filler portion 13 has a blocking portion 14 surrounding the filler portion 13. When the fitting portions 11 press against the object 10 to allow the material of the object 10 to enter or flow into the filler portions 13, the blocking portions 14 block the material of the object 10, so as to fit the fastener 1 and the object 10 firmly together.

Figure 20:
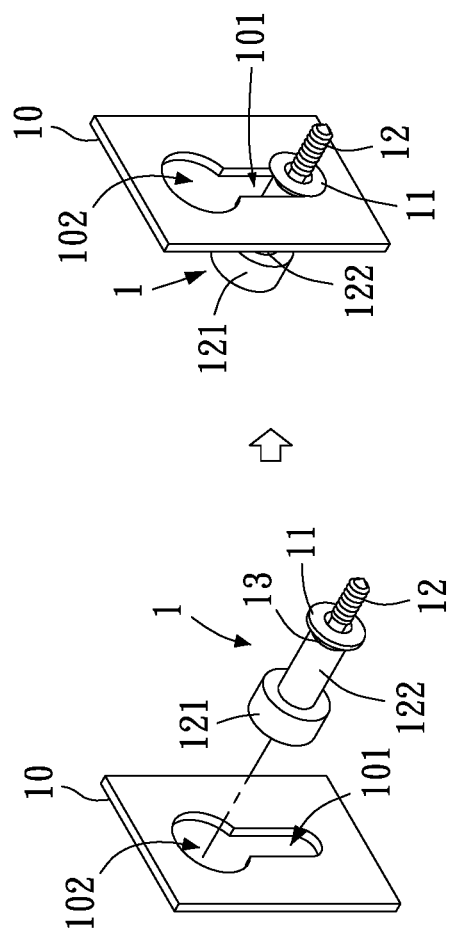
FIG. 20 is a schematic view of the fastener mounted in place according to the sixteenth embodiment of the present disclosure.

Referring to FIG. 20, in a preferred embodiment of the present disclosure, when the engaging portion 12, the head portion 121 or the body portion 122 is larger than the fitting portion 11, the engaging portion 12, the head portion 121 or the body portion 122 larger than the fitting portion 11 passes through the spreading hole portion 102 of the object 10, and the fitting portion 11 enters the sliding hole 101. Then, the fitting portion 101 presses against the object 10, such that the material of the object 10 can enter or flow into the filler portion 13, so as to fit the fastener 1 and the object 10 firmly together.

When the engaging portion 12, the head portion 121 or the body portion 122 is larger than the fitting portion 11, the engaging portion 12, the head portion 121 or the body portion 122 larger than the fitting portion 11 passes through the sliding hole 101 of the object 10, and then the fitting portion 11 presses against the object 10, such that the material of the object 10 can enter or flow into the filler portion 13, so as to fit the fastener 1 and the object 10 (not shown) together.

Figure 21:
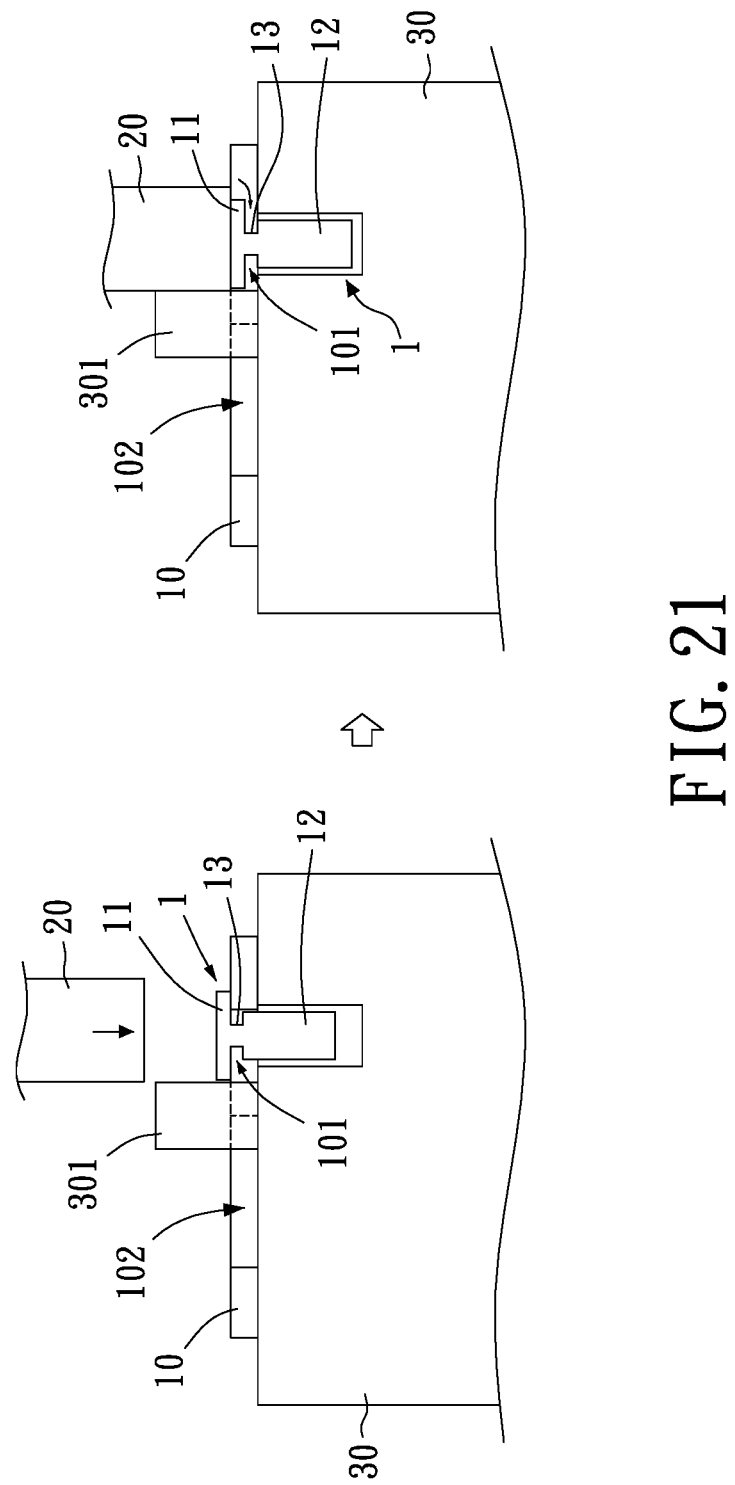
FIG. 21 is a schematic view of the fastener mounted in place according to the seventeenth embodiment of the present disclosure.
Figure 22:
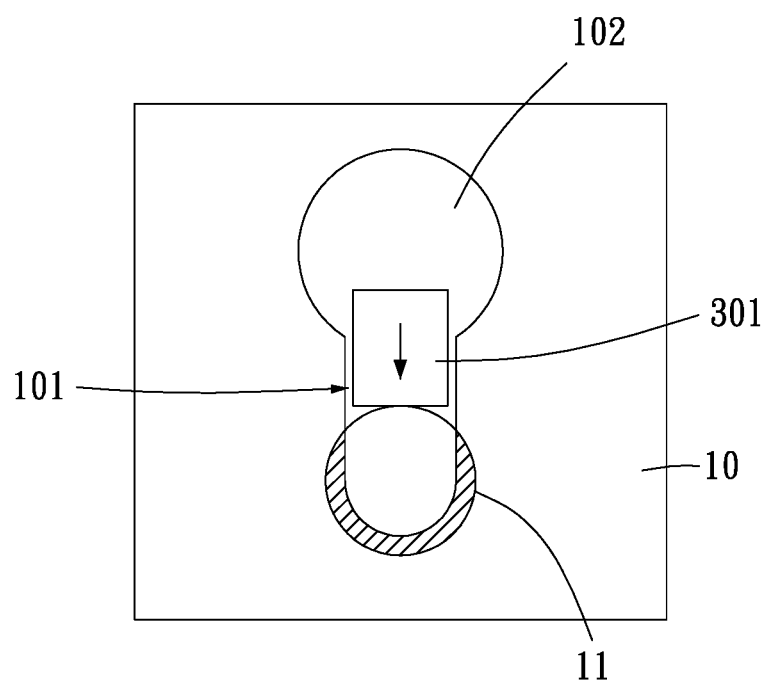
FIG. 22 is a top view of the fastener mounted in place according to the seventeenth embodiment of the present disclosure.

Referring to FIG. 21 and FIG. 22, in a preferred embodiment of the present disclosure, another die 30 carries the object 10 and the fastener 1, whereas the other die 30 has an obstructing portion 301 for confining the fastener 1 to a fitting position that enables the material of the object 10 to enter or flow into the filler portion 13.

In practice, after the fitting portion 11 has moved to the sliding hole 101, the other die 30 carries the object 10 and the fastener 1, and the obstructing portion 301 confines the fastener 1 to the fitting position that enables the material of the object 10 to enter or flow into the filler portion 13. Then, the die 20 presses against the fitting portion 11, such that the fitting portion 11 presses against the object 10. As a result, the material of the object 10 can enter or flow into the filler portion 13, so as to fit the fastener 1 and the object 10 firmly together.

In a preferred embodiment of the present disclosure, the fitting position is one that brings the maximum fitting strength, one of a predetermined fitting target, one that enables the fitting portion 11 to press against the object 10 with the largest area of, or one that allows the engaging portion 12, the body portion 122 or the head portion 121 to rest on the rim of the sliding hole 101, so as to fit the fastener 1 and the object 10 firmly together.

Figure 23:
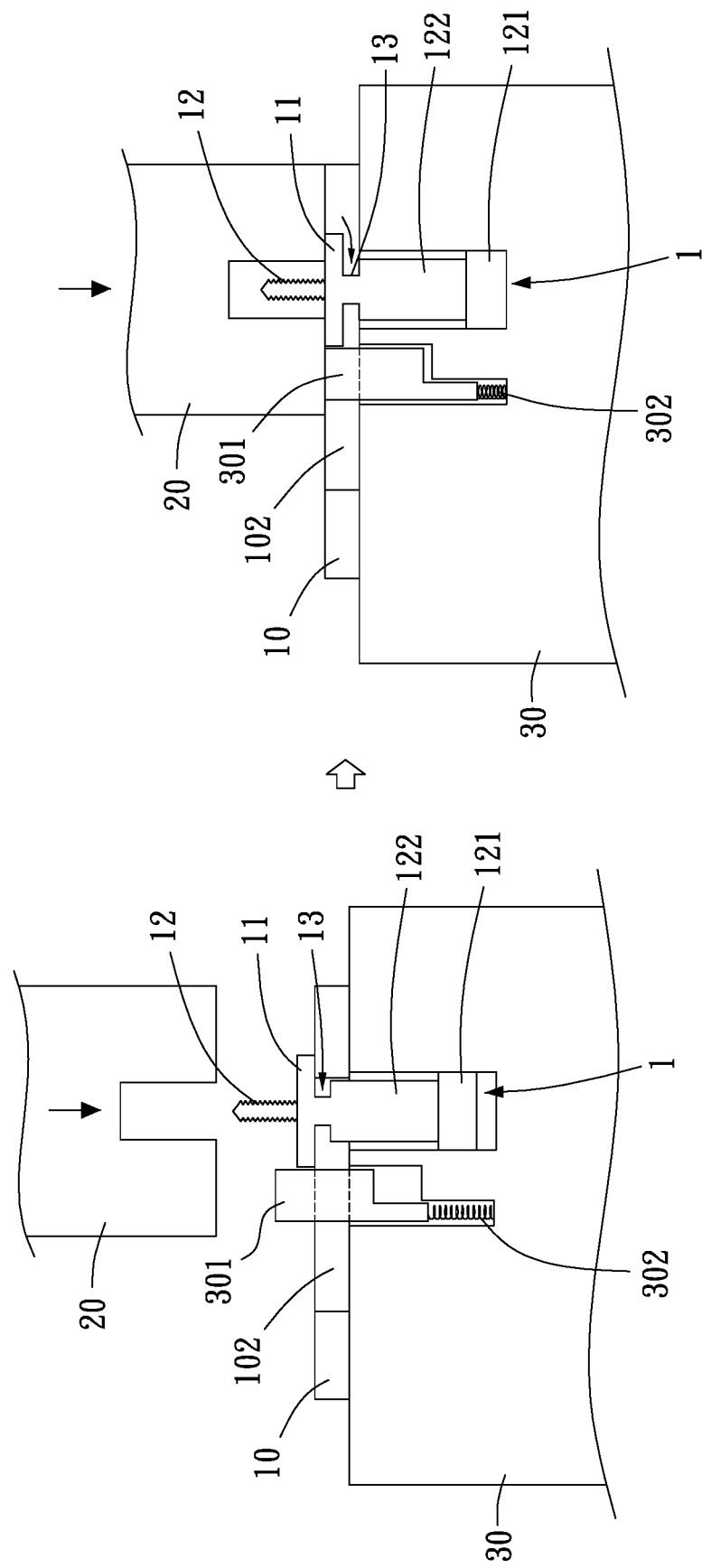
FIG. 23 is a schematic view of the fastener mounted in place according to the eighteenth embodiment of the present disclosure.

Referring to FIG. 23, in a preferred embodiment of the present disclosure, the obstructing portion 301 has a resilient structure 302. In practice, after the fitting portion 11 has moved to the sliding hole 101, the other die 30 carries the object 10 and the fastener 1, and the obstructing portion 301 confines the fastener 1 to the fitting position that enables the material of the object 10 to enter or flow into the filler portion 13. Then, the die 20 presses against the fitting portion 11, such that the obstructing portion 301 has the resilient structure 302 whereby the obstructing portion 301 undergoes motion in accordance with a press journey when the die 30 presses against the fitting portion 11, thereby allowing the fitting portion 11 to press against the object 10. Therefore, the material of the object 10 can enter or flow into the filler portion 13, so as to fit the fastener 1 and the object 10 firmly together.

Figure 24:
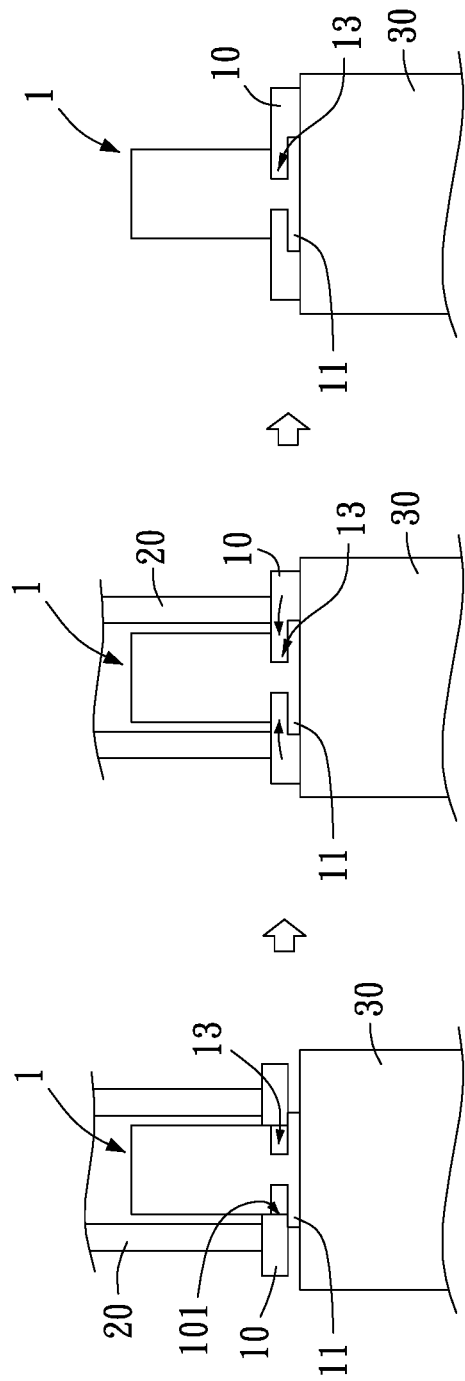
FIG. 24 is a schematic view of the fastener mounted in place according to the nineteenth embodiment of the present disclosure.

Referring to FIG. 24, in a preferred embodiment of the present disclosure, a die 20 (or apparatus) presses against the object 10, such that the material of the object 10 can enter or flow into the filler portion 13, so as to fit the fastener 1 and the object 10 together. In practice, after the fitting portion 11 has moved to the sliding hole 101, another die 30 carries the fastener 1, and then the die 20 presses against the object 10, such that the object 10 presses against the fitting portion 11. Therefore, the material of the object 10 can enter or flow into the filler portion 13, so as to fit the fastener 1 and the object 10 firmly together.

Figure 25:
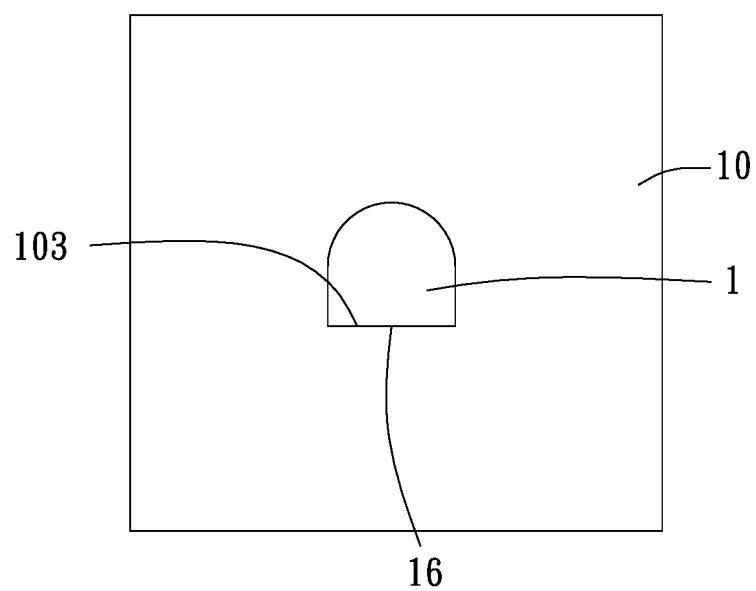
FIG. 25 is a top view of the fastener mounted in place according to the twentieth embodiment of the present disclosure.

Referring to FIG. 25, in a preferred embodiment of the present disclosure, the fastener 1 has an anti-rotation portion 16, and the object 10 has a corresponding anti-rotation portion 103, such that the anti-rotation portion 16 and the corresponding anti-rotation portion 103 correspond in position to each other and prevent rotation, so as limit the rotation of the fastener 1 relative to the object 10.

While the present disclosure has been described by means of specific embodiments, numerous modifications and variations could be made thereto by those skilled in the art without departing from the scope and spirit of the present disclosure set forth in the claims.

What is claimed is:

1. A fastener, comprising a fitting portion, an engaging portion and a filler portion, the fastener passing through a sliding hole of an object, so as for the fitting portion to press against the object, allowing a material of the object to enter or flow into the filler portion, so as to fit the fastener and the object together; wherein a die presses against the material dedicated to the object and positioned proximate to the sliding hole to allow a material of the object to deform at the sliding hole, such that the deformed material blocks the sliding hole to stop the fitting portion, or allow a material of the object to enter or flow into the filler portion.

2. The fastener of claim 1, wherein the engaging portion has a head portion and a body portion which are movably fitted together, wherein the fitting portion and the filler portion are disposed at the body portion or the head portion.

3. The fastener of claim 2, wherein the sliding hole is in communication with a spreading hole portion larger than the sliding hole, and the fitting portion or the engaging portion passes through the spreading hole portion before moving to the sliding hole, such that the fitting portion presses against the object, allowing a material of the object to enter or flow into the filler portion, so as to fit the fitting portion and the object together.

4. The fastener of claim 2, wherein, when the engaging portion, the head portion or the body portion is larger than the fitting portion, and the engaging portion, the head portion or the body portion larger than the fitting portion passes through the sliding hole of the object, such that the fitting portion presses against the object, and a material of the object enters or flows into the filler portion, so as to fit the fastener and the object together.

5. The fastener of claim 2, wherein the sliding hole is in communication with a spreading hole portion larger than the sliding hole, wherein, when the engaging portion, the head portion or the body portion is larger than the fitting portion, the engaging portion, the head portion or the body portion larger than the fitting portion passes through the spreading hole portion of the object, and the fitting portion moves to the sliding hole, such that the fitting portion presses against the object, and a material of the object enters or flows into the filler portion, so as to fit the fastener and the object together.

6. The fastener of claim 1, wherein a die presses against the fitting portion or presses against the object, so as to fit the fitting portion and the object together.

7. The fastener of claim 6, wherein another die carries the object and the fastener and has an obstructing portion, and the obstructing portion confines the fastener to a fitting position conducive to the fastener's pressing against and fitting to the object.

8. The fastener of claim 7, wherein the fitting position is one that brings maximum fitting strength, one of a predetermined fitting target, one that enables the fitting portion to press against the object with the largest area of, or one that allows the engaging portion, a body portion of the engaging portion or a head portion of the engaging portion to rest on a rim of the sliding hole.

9. The fastener of claim 7, wherein the obstructing portion has a resilient structure whereby the obstructing portion undergoes motion in accordance with a press journey when the die presses against the fitting portion or the object.

10. A method of mounting the fastener of claim 1 in place, the method comprising the step of passing the fastener through a sliding hole of an object so as for the fitting portion to press against the object and thus allow a material of the object to enter or flow into the filler portion, so as to fit the fastener and the object together.

11. The method of claim 10, wherein a die or apparatus presses against or stamps the fitting portion or the object, such that the fitting portion presses against the object, thereby allowing a material of the object to enter or flow into the filler portion.

12. The method of claim 10, wherein the sliding hole is in communication with a spreading hole portion larger than the sliding hole, and the fitting portion or the engaging portion passes through the spreading hole portion before moving to engage with the sliding hole, such that the fitting portion presses against the object to allow a material of the object to enter or flow into the filler portion, so as to fit the fastener and the object together.

13. The method of claim 10, wherein the sliding hole is in communication with a spreading hole portion larger than the sliding hole, wherein, when the engaging portion, a head portion of the engaging portion or a body portion of the engaging portion is larger than the fitting portion, the engaging portion, a head portion of the engaging portion or a body portion of the engaging portion larger than the fitting portion passes through the spreading hole portion of the object, and the fitting portion moves to engage with the sliding hole, such that the fitting portion presses against the object, and a material of the object enters or flows into the filler portion, so as to fit the fastener and the object together.

14. The method of claim 10, wherein the sliding hole is in communication with a spreading hole portion larger than the sliding hole.

15. The fastener of claim 1, wherein the sliding hole is in communication with a spreading hole portion larger than the sliding hole, and the fitting portion or the engaging portion passes through the spreading hole portion before moving to the sliding hole, such that the fitting portion presses against the object, allowing a material of the object to enter or flow into the filler portion, so as to fit the fitting portion and the object together.

16. The fastener of claim 1, wherein the fitting portion is fitted to the sliding hole, and the width of the sliding hole is less than the width of the fitting portion.

17. The fastener of claim 1, wherein a die presses against the fitting portion or the object to fit the fitting portion and the object together, and the die has at least one shaping portion for pressing against the material dedicated to the object and positioned proximate to the sliding hole, such that the material of the object is deformed at the sliding hole, and the deformed material blocks the sliding hole to stop the fitting portion, or the material of the object enters or flows into the filler portion.

18. The fastener of claim 1, wherein the filler portion has a blocking portion surrounding the filler portion.

19. The fastener of claim 1, wherein the engaging portion is a handle portion having at least one seat portion, and the seat portion has the fitting portion or the filler portion.

20. The fastener of claim 1, wherein the fastener has an anti-rotation portion, and the object has a corresponding anti-rotation portion, such that the anti-rotation portion and the corresponding anti-rotation portion correspond in position to each other and prevent rotation.

21. A fastener, comprising a fitting portion, an engaging portion and a filler portion, the fastener passing through a sliding hole of an object, so as for the fitting portion to press against the object, allowing a material of the object to enter or flow into the filler portion, so as to fit the fastener and the object together; wherein the fitting portion is fitted to the sliding hole, and the width of the sliding hole is less than the width of the fitting portion.

22. A fastener, comprising a fitting portion, an engaging portion and a filler portion, the fastener passing through a sliding hole of an object, so as for the fitting portion to press against the object, allowing a material of the object to enter or flow into the filler portion, so as to fit the fastener and the object together; wherein a die presses against the fitting portion or the object to fit the fitting portion and the object together, and the die has at least one shaping portion for pressing against the material dedicated to the object and positioned proximate to the sliding hole, such that the material of the object is deformed at the sliding hole, and the deformed material blocks the sliding hole to stop the fitting portion, or the material of the object enters or flows into the filler portion.

23. A fastener, comprising a fitting portion, an engaging portion and a filler portion, the fastener passing through a sliding hole of an object, so as for the fitting portion to press against the object, allowing a material of the object to enter or flow into the filler portion, so as to fit the fastener and the object together; wherein the engaging portion has a head portion and a body portion which are movably fitted together, wherein the fitting portion and the filler portion are disposed at the body portion or the head portion; wherein, when the engaging portion, the head portion or the body portion is larger than the fitting portion, and the engaging portion, the head portion or the body portion larger than the fitting portion passes through the sliding hole of the object, such that the fitting portion presses against the object, and a material of the object enters or flows into the filler portion, so as to fit the fastener and the object together.

24. A fastener, comprising a fitting portion, an engaging portion and a filler portion, the fastener passing through a sliding hole of an object, so as for the fitting portion to press against the object, allowing a material of the object to enter or flow into the filler portion, so as to fit the fastener and the object together; wherein the engaging portion has a head portion and a body portion which are movably fitted together, wherein the fitting portion and the filler portion are disposed at the body portion or the head portion; wherein the sliding hole is in communication with a spreading hole portion larger than the sliding hole, wherein, when the engaging portion, the head portion or the body portion is larger than the fitting portion, the engaging portion, the head portion or the body portion larger than the fitting portion passes through the spreading hole portion of the object, and the fitting portion moves to the sliding hole, such that the fitting portion presses against the object, and a material of the object enters or flows into the filler portion, so as to fit the fastener and the object together.

25. A fastener, comprising a fitting portion, an engaging portion and a filler portion, the fastener passing through a sliding hole of an object, so as for the fitting portion to press against the object, allowing a material of the object to enter or flow into the filler portion, so as to fit the fastener and the object together; wherein a die presses against the fitting portion or presses against the object, so as to fit the fitting portion and the object together; wherein another die carries the object and the fastener and has an obstructing portion, and the obstructing portion confines the fastener to a fitting position conducive to the fastener's pressing against and fitting to the object; wherein the obstructing portion has a resilient structure whereby the obstructing portion undergoes motion in accordance with a press journey when the die presses against the fitting portion or the object.

26. A fastener, comprising a fitting portion, an engaging portion and a filler portion, the fastener passing through a sliding hole of an object, so as for the fitting portion to press against the object, allowing a material of the object to enter or flow into the filler portion, so as to fit the fastener and the object together; wherein the fastener has an anti-rotation portion, and the object has a corresponding anti-rotation portion, such that the anti-rotation portion and the corresponding anti-rotation portion correspond in position to each other and prevent rotation.

\* \* \* \* \*